United States Patent [19]
Kabuo et al.

[11] Patent Number: 5,247,656
[45] Date of Patent: Sep. 21, 1993

[54] METHOD AND APPARATUS FOR CONTROLLING A CLOCK SIGNAL

[75] Inventors: Hideyuki Kabuo; Hisakazu Edamatsu; Takashi Taniguchi, all of Osaka, Japan

[73] Assignee: Matsushita Electric Industrial Co., Ltd., Osaka, Japan

[21] Appl. No.: 527,186

[22] Filed: May 23, 1990

[30] Foreign Application Priority Data

Jun. 1, 1989 [JP] Japan .................................. 1-140465
Apr. 3, 1990 [JP] Japan .................................. 2-88502

[51] Int. Cl.$^5$ ............................................ G06F 13/00
[52] U.S. Cl. ........................ 395/550; 364/DIG. 1; 364/270.2; 364/270.3; 364/271.2
[58] Field of Search .................... 395/550; 364/270.2, 364/270.3, 271.2

[56] References Cited
U.S. PATENT DOCUMENTS

| | | | |
|---|---|---|---|
| 4,819,164 | 4/1989 | Branson | 395/550 |
| 4,931,986 | 6/1990 | Daniel et al. | 395/550 |
| 4,981,296 | 1/1991 | Shiraishi et al. | 395/550 |

*Primary Examiner*—Dale M. Shaw
*Assistant Examiner*—Diane E. Smith
*Attorney, Agent, or Firm*—Lowe, Price, LeBlanc & Becker

[57] ABSTRACT

A data processing device includes first and second blocks which have different processing times and which operate in synchronism with a clock signal. One of the first and second blocks is selected and enabled in accordance with an instruction representing which of the first and second blocks should be selected and enabled. A clock change signal is generated on the basis of the instruction. A period of the clock signal is changed in accordance with the clock change signal.

13 Claims, 8 Drawing Sheets

METHOD AND APPARATUS FOR CONTROLLING A CLOCK SIGNAL

BACKGROUND OF THE INVENTION

This invention relates to a method and an apparatus for controlling a clock signal in a data processing circuit. This invention also relates to a high-speed data processing device.

Some data processing circuits include first and second sections each operating in synchronism with a pair of biphase clock signals. In some cases, the first section completes data processing operation within a period half the period of data processing operation by the second section. In these cases, the first section waits or wastes a time corresponding to a half of the period of data processing operation by the second section. The wait lowers the operation speed of the data processing circuit.

SUMMARY OF THE INVENTION

It is a first object of this invention to provide a method of controlling a clock signal which enables high speed operation of a data processing circuit.

It is a second object of this invention to provide an apparatus for controlling a clock signal which enables high speed operation of a data processing circuit.

It is a third object of this invention to provide a high-speed data processing device.

In accordance with the invention, there is provided, in a data processing circuit including first and second blocks which have different processing times and which operate in synchronism with a clock signal, wherein at least one of the first and second blocks is selected and enabled in accordance with an instruction changeable among first, second, and third states, the first state representing that the first block should be selected and enabled, the second state representing that the second block should be selected and enabled, the third state representing that both the first and second blocks should be selected and enabled, a method of controlling the clock signal which comprises the steps of detecting a current state of the instruction; setting a period of the clock signal to a first predetermined period when the current state of the instruction is detected to be the first state; setting the period of the clock signal to a second predetermined period when the current state of the instruction is detected to be the second state, the second predetermined period being longer than the first predetermined period; and setting the period of the clock signal to the second predetermined period when the current state of the instruction is detected to be the third state.

In such a data processing circuit, wherein second coded information of the instruction represents a desired period of the clock signal, the desired period having a predetermined relation with which of the first and second blocks should be selected, a method of controlling the clock signal according to the invention comprises the steps of: detecting a current state of the first coded information; setting an actual period of the clock signal to a first predetermined period in response to the second coded information when the current state of the first coded information is detected to be the first state; setting the actual period of the clock signal to a second predetermined period in response to the second coded information when the current state of the first coded information is detected to be the second state, the second predetermined period being longer than the first predetermined period; and setting the actual period of the clock signal to the second predetermined period in response to the second coded information when the current state of the first coded information is detected to be the third state.

In accordance with another aspect of the invention, in a data processing circuit including first and second blocks which have different processing times and which operate in synchronism with a clock signal, wherein at least one of the first and second blocks is selected and enabled in accordance with first coded information of an instruction, there is provided an apparatus for controlling the clock signal, comprising means for detecting a current state of the instruction; means for setting a period of the clock signal to a first predetermined period when the current state of the instruction is detected by the detecting means to be the first state; means for setting the period of the clock signal to a second predetermined period when the current state of the instruction is detected by the detecting means to be the second state, the second predetermined period being longer than the first predetermined period; and means for setting the period of the clock signal to the second predetermined period when the current state of the instruction is detected by the detecting means to be the third state.

In such a data processing circuit, wherein second coded information of the instruction represents a desired period of the clock signal, the desired period having a predetermined relation with which of the first and second blocks should be selected, an apparatus for controlling the clock signal according to the invention comprises: means for detecting a current state of the first coded information; means for setting an actual period of the clock signal to a first predetermined period in response to the second coded information when the current state of the first coded information is detected by the detecting means to be the first state; means for setting the actual period of the clock signal to a second predetermined period in response to the second coded information when the current state of the first coded information is detected by the detecting means to be the second state, the second predetermined period being longer than the first predetermined period; and means for setting the actual period of the clock signal to the second predetermined period in response to the second coded information when the current state of the first coded information is detected by the detecting means to be the third state.

In accordance with another aspect of the invention, there is provided a data processing device comprising: means for generating a clock signal having a period changeable between first and second predetermined periods, the second predetermined period being longer than the first predetermined period; first and second data processing blocks which have different processing times and which operate in synchronism with the clock signal; means for selecting and enabling at least one of the first and second blocks; means for setting the period of the clock signal to the first predetermined period when the selecting/enabling means selects and enables the first block; means for setting the period of the clock signal to the second predetermined period when the selecting/enabling means selects and enables the second block; and means for setting the period of the clock signal to the second predetermined period when the selecting/enabling means selects and enables both the first and second blocks.

In each of the foregoing aspects of the invention, the second predetermined period may equal twice the first predetermined period.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
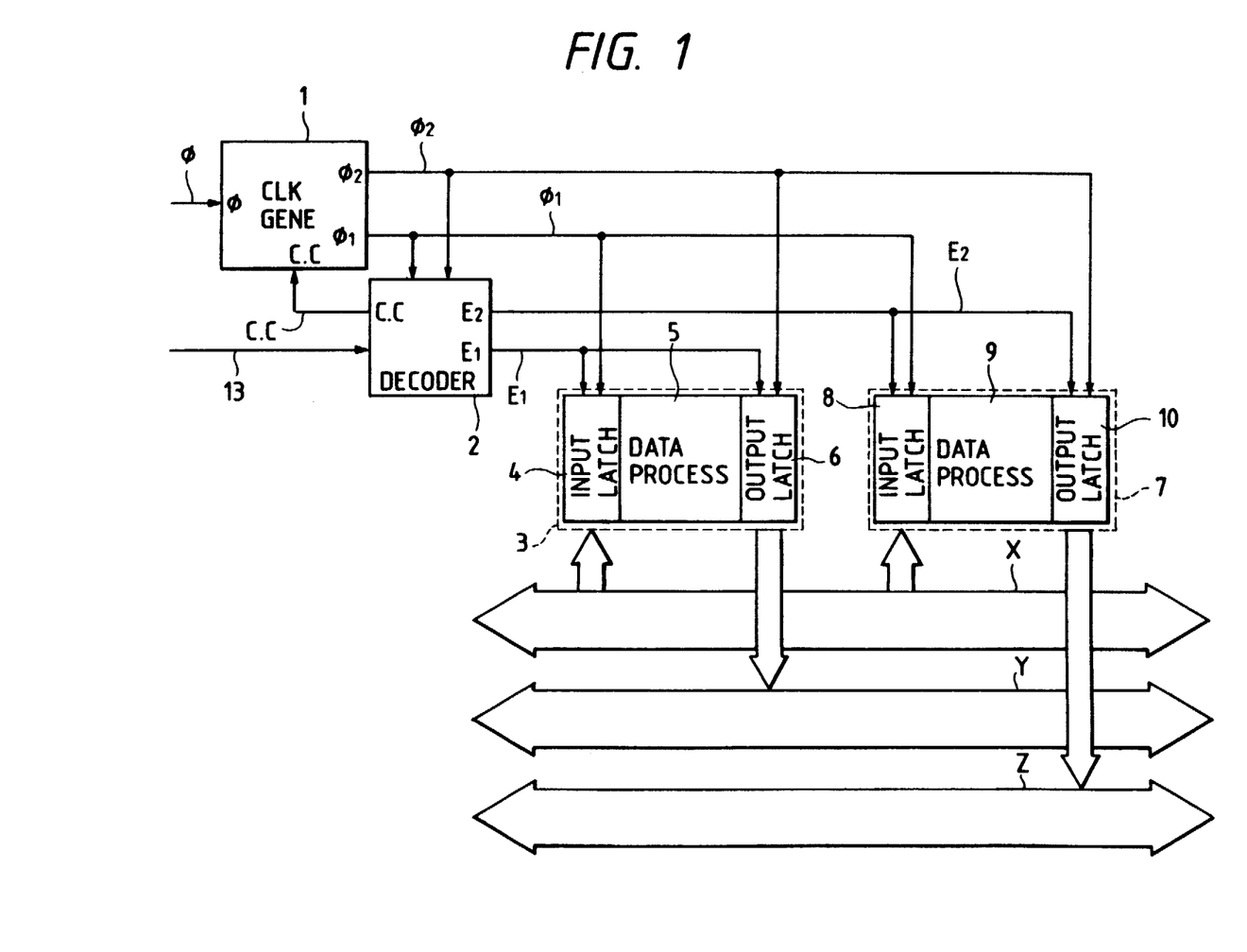
FIG. 1 is a block diagram of a data processing device according to a first embodiment of this invention.

With reference to FIG. 1, a data processing device includes a clock generator 1 producing a pair of clock signals $\phi 1$ and $\phi 2$ on the basis of an external clock signal $\phi$. In addition, the clock generator 1 changes the periods of the clock signals $\phi 1$ and $\phi 2$ between a predetermined period T and a predetermined period 2T in response to a clock change signal c.c fed from an instruction decoder 2. The predetermined period 2T equals twice the predetermined period T.

The data processing device includes first and second blocks 3 and 7 having different processing times. Each of the blocks 3 and 7 receives the clock signals $\phi 1$ and $\phi 2$ from the clock generator 1 and operates in synchronism with the clock signals $\phi 1$ and $\phi 2$.

The instruction decoder 2 receives the clock signals $\phi 1$ and $\phi 2$ from the clock generator 1 and decodes an external instruction signal 13 in synchronism with the clock signals $\phi 1$ and $\phi 2$. The external instruction signal 13 contains first coded information which designates a block or blocks to be selected and enabled, and second coded information which represents a desired period of the clock signals $\phi 1$ and $\phi 2$. The instruction decoder 2 selects one or two of the blocks 3 and 7 and enables the selected block or blocks in accordance with the first coded information of the external instruction signal 13. Specifically, when the first coded information of the external instruction signal 13 requires the first block 3 to be selected, the instruction decoder 2 outputs an enable signal E1 to the first block 3 to enable the latter. When the first coded information of the external instruction signal 13 requires the second block 7 to be selected, the instruction decoder 2 outputs an enable signal E2 to the second block 7 to enable the latter. When the first coded information of the external instruction signal 13 requires both the blocks 3 and 7 to be selected, the instruction decoder 2 outputs the enable signals E1 and E2 to the blocks 3 and 7 to enable the blocks 3 and 7. In addition, the instruction decoder 2 generates the clock change signal c.c in accordance with the second coded information of the external instruction signal 13. The first coded information and the second coded information of the external instruction signal 13 have a predetermined relation as follows. When the first coded information requires the first block 3 to be selected, the desired period of the clock signals $\phi 1$ and $\phi 2$ which is represented by the second coded information is equal to the predetermined value T. When the first coded information requires the second block 7 to be selected, the desired period of the clock signals $\phi 1$ and $\phi 2$ which is represented by the second coded information is equal to the predetermined value 2T. When the first coded information requires both the blocks 3 and 7 to be selected, the desired period of the clock signals $\phi 1$ and $\phi 2$ which is represented by the second coded information is equal to the predetermined value 2T.

Figure 7:
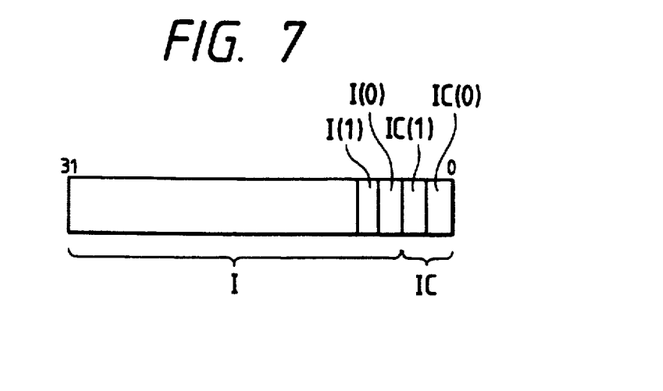
FIG. 7 is a diagram showing the format of an external instruction signal in the data processing device of FIG. 1.

FIG. 7 shows a format of the external instruction signal 13. One block of the external instruction signal 13 has a predetermined number (32 for example) of bits separated into a first group I and a second group IC. The bits $I(n) \ldots, I(1), I(0)$ in the first group I has coded information representing a normal instruction or instructions. Specifically, the bits $I(1)$ and $I(0)$ has coded information which designates a block or blocks to be selected and enabled. The second group IC follows the first group I and has two bits $IC(1)$ and $IC(0)$. The second group IC has coded information which represents a desired period of the clock signals $\phi 1$ and $\phi 2$. Specifically, the second group IC being "00" represents that the desired clock period equals the period T. The second group IC being "01" represents that the desired clock period equals the period 2T. Thus, the bit $IC(0)$ represents the desired clock period.

Figure 8:
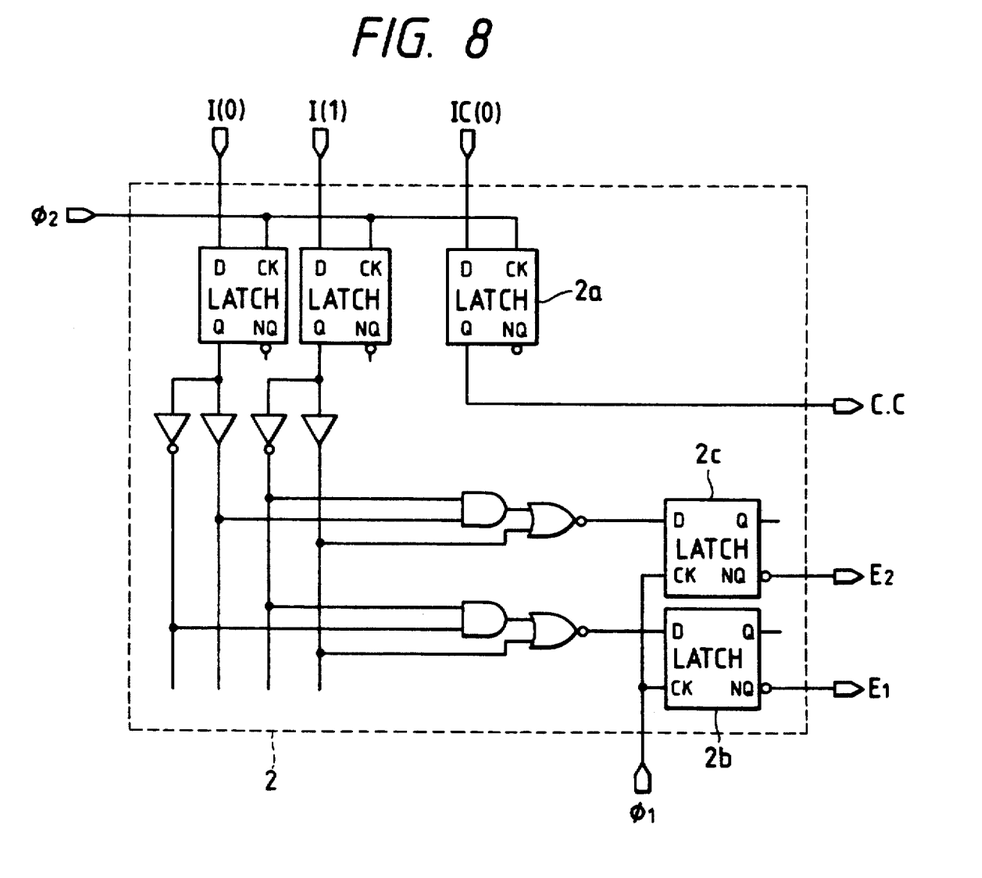
FIG. 8 is a block diagram of a part of the instruction decoder in the data processing device of FIG. 1.

FIG. 8 shows a part of the internal design of the instruction decoder 2. The instruction decoder 2 includes a D latch $2a$ whose D input terminal is subjected to the bit $IC(0)$ of the external instruction signal 13. A CK terminal of the latch $2a$ is subjected to the clock signal $\phi 2$. The latch $2a$ samples the bit $IC(0)$ of the external instruction signal 13 in synchronism with the clock signal $\phi 2$. A signal generated at a Q output terminal of the latch $2a$ composes the clock change signal c.c.

The instruction decoder 2 includes D latches which sample the bits $I(n) \ldots, I(1), I(0)$ of the external instruction signal 13 in synchronism with the clock signal $\phi 2$. The sampled instruction information is transferred from the D latches to a main decoding section including a combination of buffers, inverters, AND gates, and NOR gates. The instruction decoder 2 includes D latches $2b$ and $2c$. An output signal from the main decoding section which relates to the bits $I(1)$ and $I(0)$ of the external instruction signal 13 is sampled by the latches $2b$ and $2c$ in synchronism with the clock signal $\phi 1$. A signal generated at an NQ output terminal of the latch $2b$ composes the enable signal E1. A signal generated at an NQ output terminal of the latch $2c$ composes the enable signal E2.

As shown in FIG. 1, the first block 3 includes a combination of an input latch 4, a data processing section 5, and an output latch 6. The internal data processing time of the data processing section 5 is equal to or smaller than the time T. The input latch 4 and the output latch 6 are connected to the instruction decoder 2 to receive the enable signal E1. The input latch 4 is connected to a data bus X. When the input latch 4 is enabled, the input latch 4 receives data from the data bus X. The output latch 6 is connected to a data bus Y. When the output latch 6 is enabled, the output latch 6 outputs data to the data bus Y.

The second block 7 includes a combination of an input latch 8, a data processing section 9, and an output latch 10. The internal data processing time of the data processing section 9 is equal to or smaller than the time 2T. The input latch 8 and the output latch 10 are connected to the instruction decoder 2 to receive the enable signal E2. The input latch 8 is connected to the data bus X. When the input latch 8 is enabled, the input latch 8 receives data from the data bus X. The output latch 10 is connected to a data bus Z. When the output latch 10 is enabled, the output latch 10 outputs data to the data bus Z.

For example, the first block 3 includes an adder while the second block 7 includes a multiplier. In general, the processing time of a multiplier is longer than the processing time of an adder.

Figure 2:
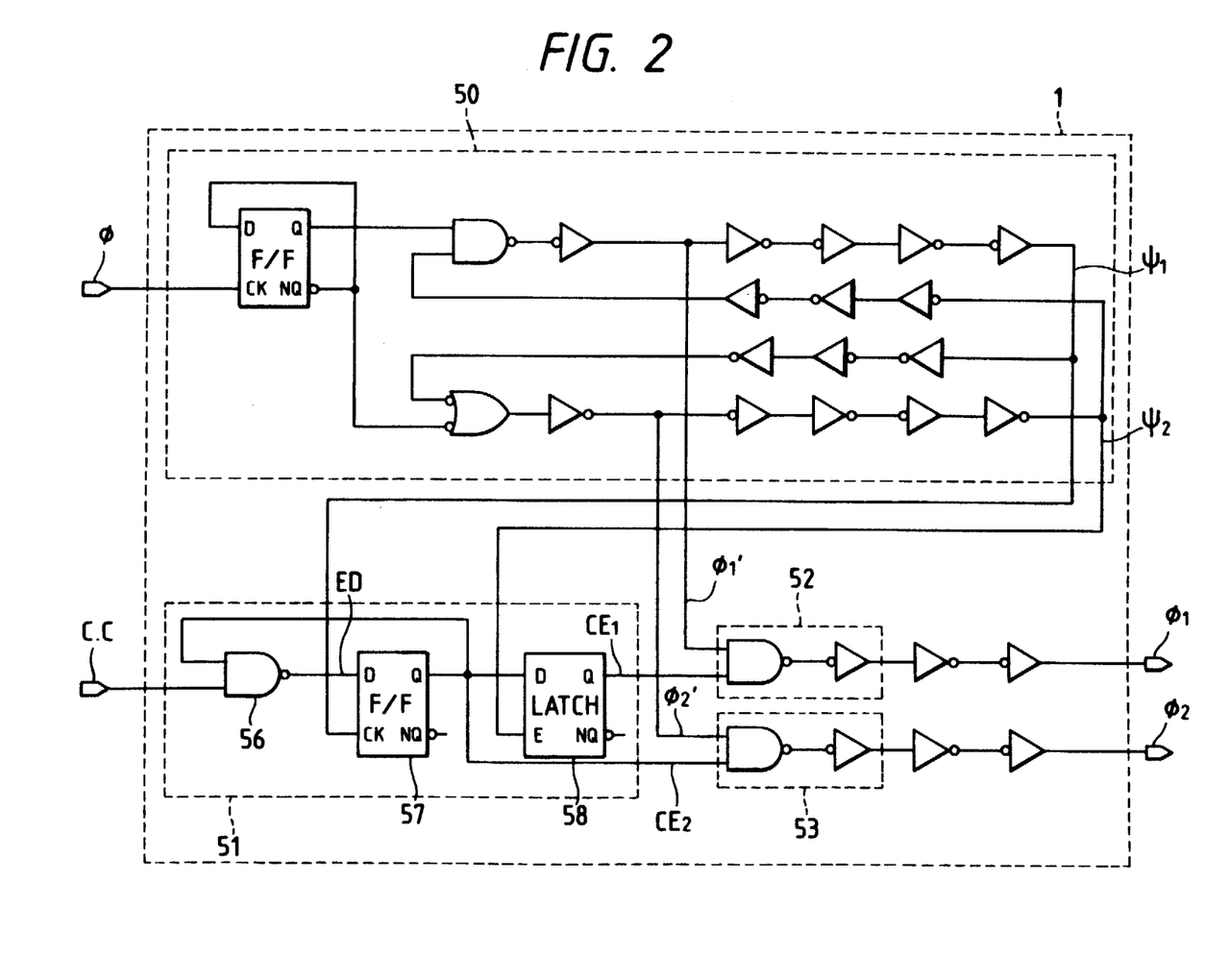
FIG. 2 is a block diagram of the clock generator of FIG. 1.

As shown in FIG. 2, the clock generator 1 includes a biphase clock generator 50 and a clock enable generator 51. The biphase clock generator 50 has a section of a substantially known design which generates a pair of first biphase clock signals $\phi1'$ and $\phi2'$ on the basis of the external clock signal $\phi$ (see FIG. 3). The first biphase clock signals $\phi1'$ and $\phi2'$ have periods equal to the predetermined period T. In addition, the biphase clock generator 50 has delay circuits which generate a pair of second biphase clock signals $\phi1$ and $\phi2$ by slightly delaying the first biphase clock signals $\phi1'$ and $\phi2'$ (see FIG. 3). The delay circuits include cascade combinations of inverters.

The clock enable generator 51 includes a NAND gate 56, a flip-flop 57, and a D latch 58. A first input terminal of the NAND gate 56 receives the clock change signal c.c. A second input terminal of the NAND gate 56 receives a Q output signal from the flip-flop 57. The NAND gate 56 generates an enable data signal ED on the basis of the clock change signal c.c and the Q output signal from the flip-flop 57 (see FIG. 3). A D input terminal of the flip-flop 57 receives the enable data signal ED. A CK input terminal of the flip-flop 57 receives the clock signal $\phi1$ from the biphase clock generator 50. The flip-flop 57 generates the Q output signal, that is, a clock enable signal CE2 on the basis of the enable data signal ED and the clock signal $\phi1$ (see FIG. 3). The Q output signal from the flip-flop 57 is fed to the NAND gate 56 and a D input terminal of the latch 58. An E terminal of the latch 58 receives the clock signal $\phi2$ from the biphase clock generator 50. The latch 58 generates a Q output signal, that is, a clock enable signal CE1 on the basis of the clock enable signal CE2 and the clock signal $\phi2$ (see FIG. 3).

The clock generator 1 includes an AND gate 52. A first input terminal of the AND gate 52 receives the clock enable signal CE1 from the clock enable generator 51. A second input terminal of the AND gate 52 receives the clock signal $\phi1'$ from the biphase clock generator 50. The AND gate 52 generates the clock signal $\phi1$ on the basis of the clock enable signal CE1 and the clock signal $\phi1'$ (see FIG. 3). The clock signal $\phi1$ is outputted to the blocks 3 and 7 through a buffer or a delay circuit including a cascade combination of inverters.

The clock generator 1 includes an AND gate 53. A first input terminal of the AND gate 53 receives the clock enable signal CE2 from the clock enable generator 51. A second input terminal of the AND gate 53 receives the clock signal $\phi2'$ from the biphase clock generator 50. The AND gate 53 generates the clock signal $\phi2$ on the basis of the clock enable signal CE2 and the clock signal $\phi2'$ (see FIG. 3). The clock signal $\phi2$ is outputted to the blocks 3 and 7 through a buffer or a delay circuit including a cascade combination of inverters.

Figure 3:
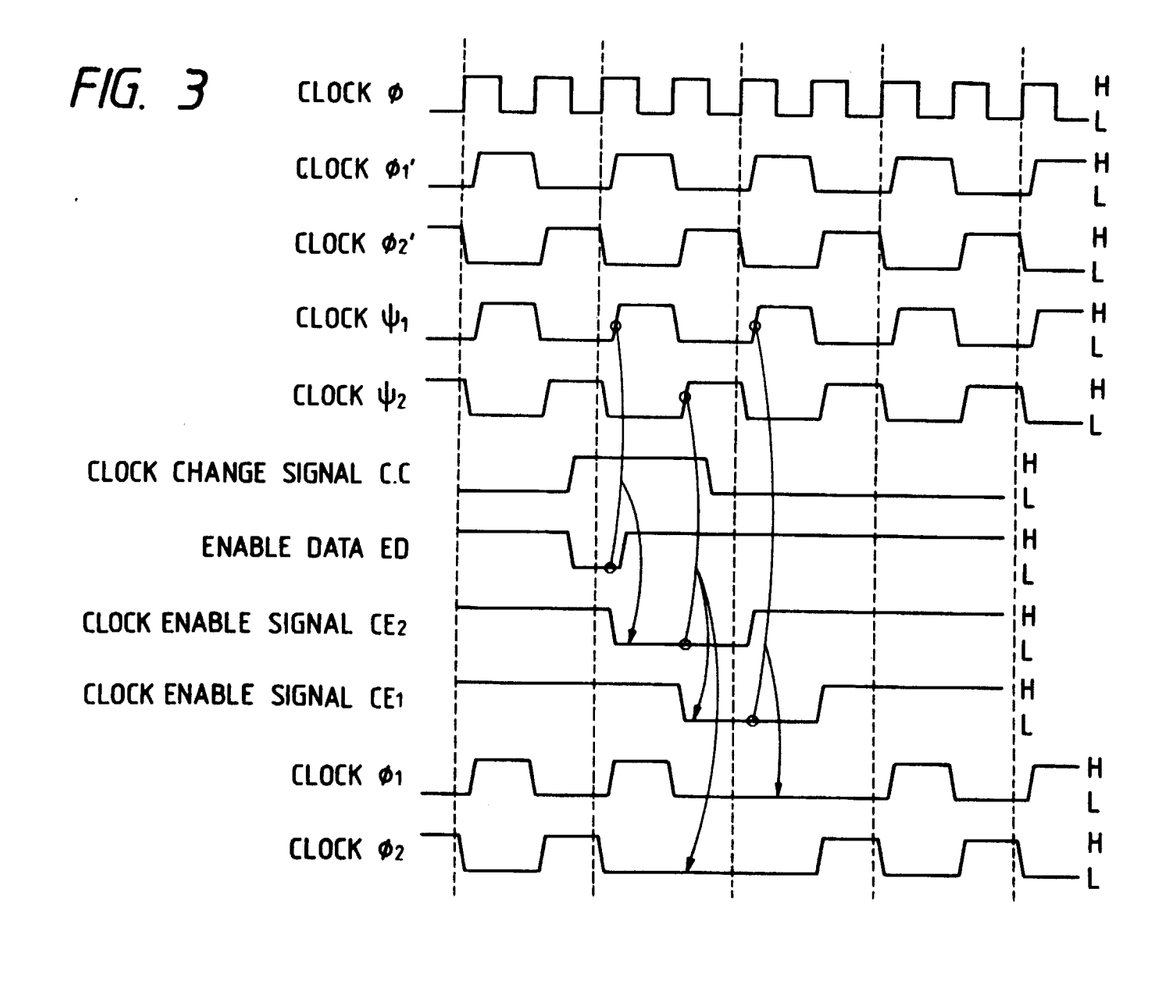
FIG. 3 is a timing diagram showing various signals in the clock generator of FIG. 2.

The clock generator 1 operates as follows. Under initial conditions where the clock change signal c.c assumes a low level and both the clock enable signals CE1 and CE2 assume high levels, the clock signals $\phi1$ and $\phi2$ essentially agree with the clock signals $\phi1'$ and $\phi2'$ respectively and the enable data signal ED assumes a high level as shown in FIG. 3. Under these conditions, the periods of the clock signals $\phi1$ and $\phi2$ are equal to the predetermined period T. When the clock change signal c.c changes from the low level to a high level, the enable data signal ED changes from the high level to a low level through the NAND operation between the clock change signal c.c and the clock enable signal CE2 which is executed by the NAND gate 56. Then, at the moment of the occurrence of a positive-going level change of the clock signal $\phi1$, the flip-flop 57 samples the enable data signal ED and thereby changes the clock enable signal CE2 to a low level as shown in FIG. 3. In addition, the flip-flop 57 functions to return the enable data signal ED to the high level. Subsequently, when the clock signal $\phi2$ assumes a high level, the D latch 58 samples the clock enable signal CE2 and thereby changes the clock enable signal CE1 to a low level as shown in FIG. 3. As a result, the clock signal $\phi2$ remains at the low level while the clock enable signal CE2 continues to assume the low level. Similarly, the clock signal $\phi1$ remains at the low level while the clock enable signal CE1 continues to assume the low level. Since the flip-flop 57 provides a feedback loop of the clock enable signal CE2, the interval or duration of the low level of the clock enable signal CE2 is limited to one period of the clock signal $\phi1$. Similarly, the interval or duration of the low level of the clock enable signal CE1 is limited to one period of the clock signal $\phi2$. Thus, the periods of the clock signals $\phi1$ and $\phi2$ are lengthened to the predetermined period 2T in response to the change of the clock change signal c.c from the low level to the high level as shown in FIG. 3.

The data processing device of FIG. 1 operates as follows. The clock generator 1 produces the clock signals $\phi1$ and $\phi2$ on the basis of the external clock signal $\phi$. The clock generator 1 changes the periods of the clock signals $\phi1$ and $\phi2$ in accordance with the clock change signal c.c fed from the instruction decoder 2. When the clock change signal c.c is in the low level state, the periods of the clock signals $\phi1$ and $\phi2$ are equal to the predetermined value T. When the clock change signal c.c is in the high level state, the periods of the clock signals $\phi1$ and $\phi2$ are equal to the predetermined value 2T.

As described previously, the external instruction signal 13 contains coded information which designates a block or blocks to be enabled and which represents a desired period of the clock signals $\phi1$ and $\phi2$. When the clock signal $\phi2$ is in the high level state, the instruction decoder 2 receives and decodes the external instruction signal 13.

Figure 4:
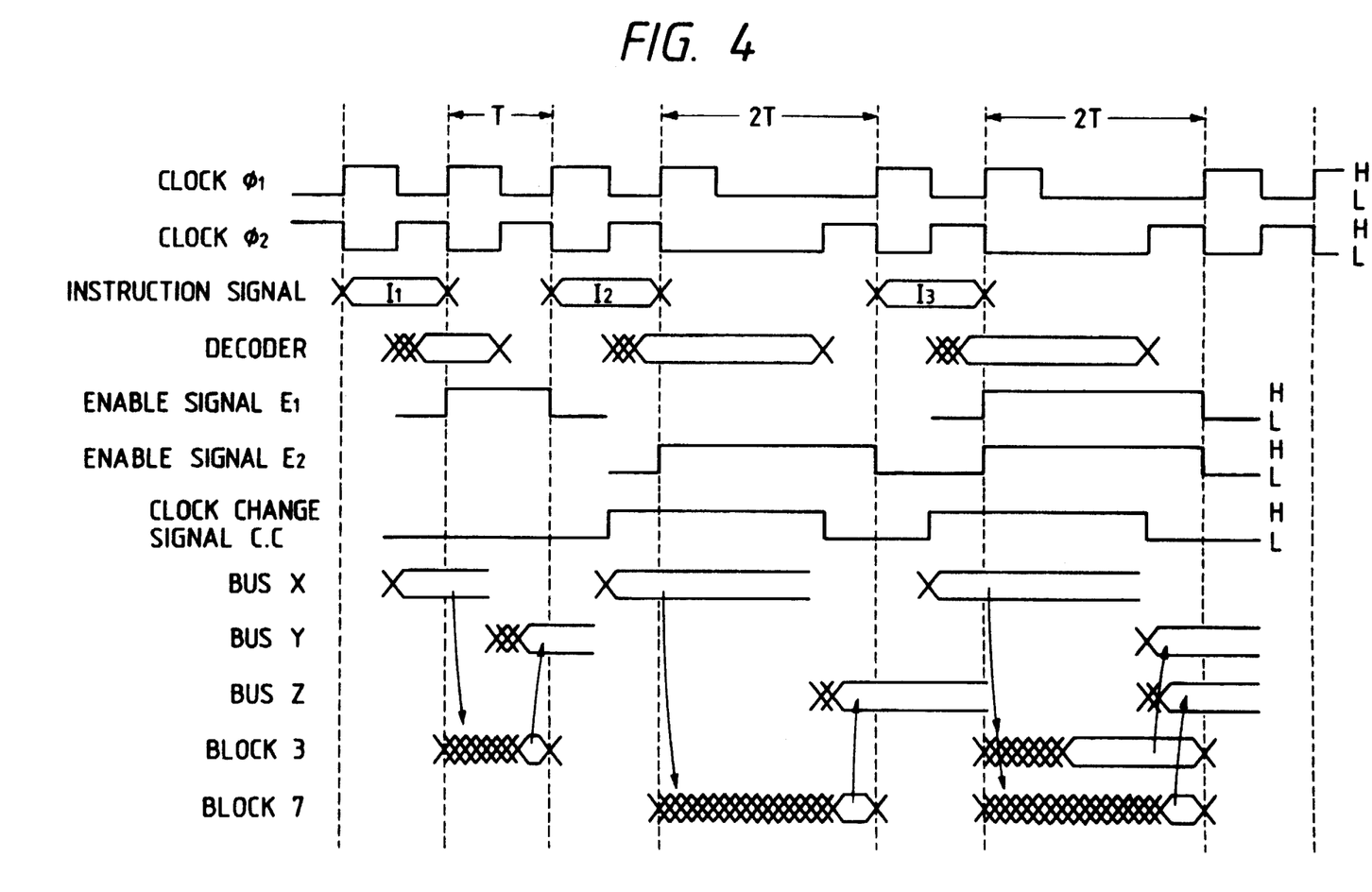
FIG. 4 is a timing diagram showing various signals in the data processing device of FIG. 1.

The operation of the data processing device of FIG. 1 will now be further explained with reference to FIG. 4. In the case where the external instruction signal 13 is of a first type I1 which requires the first block 3 to be selected and which represents the predetermined period T as the desired periods of the clock signals $\phi1$ and $\phi2$, the instruction decoder 2 sets the clock change signal c.c to the low level state so that the periods of the clock signals $\phi1$ and $\phi2$ are equal to the predetermined period T. In addition, the instruction decoder 2 outputs the high-level enable signal E1 to the first block 3 so that the first block 3 is enabled. The high-level enable signal E1 is started in synchronism with the clock signals $\phi1$ and $\phi2$. The duration of the high-level enable signal E1 equals the time T. The other enable signal E2 is held in the low level state so that the second block 7 remains inactive. In the first block 3, the input latch 4 receives data from the data bus X and the data processing section 5 processes the received data when both the enable signal E1 and the clock signal $\phi1$ are in the high level states. The data processing section 5 completes the data processing within the time T. When both the enable signal E1 and the clock signal $\phi2$ are in the high level states, the data corresponding to the result of the data processing are outputted to the data bus Y via the output latch 6.

In the case where the external instruction signal 13 is of a second type I2 which requires the second block 7 to be selected and which represents the predetermined period 2T as the desired periods of the clock signals $\phi1$ and $\phi2$, the instruction decoder 2 sets the clock change signal c.c to the high level state so that the periods of the clock signals $\phi1$ and $\phi2$ are equal to the predetermined period 2T. In addition, the instruction decoder 2 outputs the high-level enable signal E2 to the second block 7 so that the second block 7 is enabled. The high-level enable signal E2 is started in synchronism with the clock signals $\phi1$ and $\phi2$. The duration of the high-level enable signal E2 equals the time 2T. The other enable signal E1 is held in the low level state so that the first block 3 remains inactive. In the second block 7, the input latch 8 receives data from the data bus X and the data processing section 9 processes the received data when both the enable signal E2 and the clock signal $\phi1$ are in the high level states. The data processing section 9 completes the data processing within the time 2T. When both the enable signal E2 and the clock signal $\phi2$ are in the high level states, the data corresponding to the result of the data processing are outputted to the data bus Z via the output latch 10.

In the case where the external instruction signal 13 is of a third type I3 which requires both the blocks 3 and 7 to be selected and which represents the predetermined period 2T as the desired periods of the clock signals $\phi1$ and $\phi2$, the instruction decoder 2 sets the clock change signal c.c to the high level state so that the periods of the clock signals $\phi1$ and $\phi2$ are equal to the predetermined period 2T. In addition, the instruction decoder 2 outputs the high-level enable signal E1 to the first block 3 so that the first block 3 is enabled. The instruction decoder 2 also outputs the high-level enable signal E2 to the second block 7 so that the second block 7 is enabled. The high-level enable signals E1 and E2 are started in synchronism with the clock signals $\phi1$ and $\phi2$. The durations of the high-level enable signals E1 and E2 are equal to the time 2T. In the first block 3, the input latch 4 receives data from the data bus X and the data processing section 5 processes the received data when both the enable signal E1 and the clock signal $\phi1$ are in the high level states. The data processing section 5 completes the data processing within the time T. When both the enable signal E1 and the clock signal $\phi2$ are in the high level states, the data corresponding to the result of the data processing are outputted to the data bus Y via the output latch 6. In the second block 7, the input latch 8 receives data from the data bus X and the data processing section 9 processes the received data when both the enable signal E2 and the clock signal $\phi1$ are in the high level states. The data processing section 9 completes the data processing within the time 2T. When both the enable signal E2 and the clock signal $\phi2$ are in the high level states, the data corresponding to the result of the data processing are outputted to the data bus Z via the output latch 10.

As understood from the previous description, when the first block 3 spending a shorter processing time is selected, the periods of the clock signals $\phi1$ and $\phi2$ are shortened commensurately. Thus, the first block 3 is prevented from waiting or wasting an unnecessary time, and a high operation speed of the data processing device is enabled.

The data processing device of FIGS. 1-4 may be modified as follows. In a first modification, the external instruction signal 13 has a known format, and the second coded information related to the desired clock period is omitted from the external instruction signal 13. In the first modification, the instruction decoder 2 includes a decoding section of a known design. The known decoding section generates primary enable signals E1' and E2' in accordance with the external instruction signal 13. The known decoding section converts the primary enable signals E1' and E2' into the final enable signals E1 and E2 through sampling and holding processes synchronous with the clock signals $\phi1$ and $\phi2$. In the first modification, the primary enable signal E2' corresponding to the final enable signal E2 is used as the clock change signal c.c. The primary enable signal E2' advances from the final enable signal E2 in a time axis.

In a second modification, the clock signals $\phi1$ and $\phi2$ have equal 50% duty cycles when the periods of the clock signals $\phi1$ and $\phi2$ are equal to the predetermined period 2T.

A third modification uses first and second clock generators and a selector in place of the clock generator 1. The first clock generator outputs a pair of first biphase clock signals having periods equal to the predetermined period T. The second clock generator outputs a pair of second clock signals having periods equal to the predetermined period 2T. The first clock signals and the second clock signals are selected by the selector in accordance with the clock change signal c.c.

DESCRIPTION OF THE SECOND PREFERRED EMBODIMENT

Figure 5:
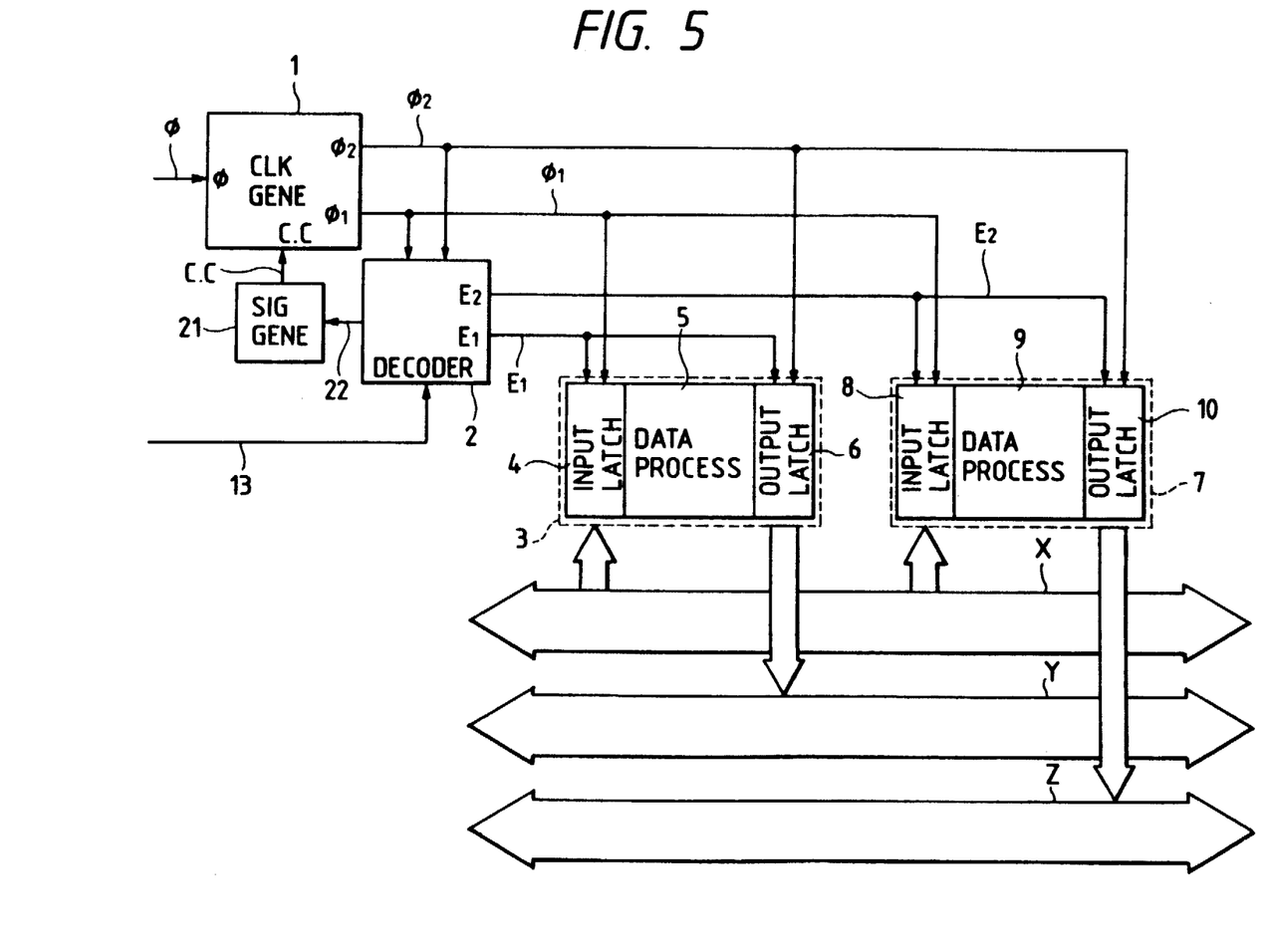
FIG. 5 is a block diagram of a data processing device according to a second embodiment of this invention.

With reference to FIG. 5, a data processing device includes a clock generator 1 producing a pair of clock signals $\phi1$ and $\phi2$ on the basis of an external clock signal $\phi$. In addition, the clock generator 1 changes the periods of the clock signals $\phi1$ and $\phi2$ between a predetermined period T and a predetermined period 2T in response to a clock change signal c.c fed from a clock change signal generator 21. The predetermined period 2T equals twice the predetermined period T. The clock generator 1 has a design similar to the design of the clock generator in the embodiment of FIGS. 1-4.

The data processing device includes first and second blocks 3 and 7 having different processing times. Each of the blocks 3 and 7 receives the clock signals $\phi1$ and $\phi 2$ from the clock generator 1 and operates in synchronism with the clock signals $\phi 1$ and $\phi 2$.

An instruction decoder 2 receives the clock signals $\phi 1$ and $\phi 2$ from the clock generator 1 and decodes an external instruction signal 13 in synchronism with the clock signals $\phi 1$ and $\phi 2$. The external instruction signal 13 contains coded information which designates a block or blocks to be selected and enabled. The instruction decoder 2 selects one or two of the blocks 3 and 7 and enables the selected block or blocks in accordance with the coded information of the external instruction signal 13. Specifically, when the coded information of the external instruction signal 13 requires the first block 3 to be selected, the instruction decoder 2 outputs an enable signal E1 to the first block 3 to enable the latter. When the coded information of the external instruction signal 13 requires the second block 7 to be selected, the instruction decoder 2 outputs an enable signal E2 to the second block 7 to enable the latter. When the coded information of the external instruction signal 13 requires both the blocks 3 and 7 to be selected, the instruction decoder 2 outputs the enable signals E1 and E2 to the blocks 3 and 7 to enable the blocks 3 and 7. In addition, the instruction decoder 2 generates a block set signal 22 in accordance with the coded information of the external instruction signal 13 which relates to the selection of the blocks 3 and 7. The block set signal 22 is fed to the clock change signal generator 21.

The clock change signal generator 21 produces the clock change signal c.c in accordance with the block set signal 22. Since the block set signal 22 depends on the selection of the blocks 3 and 7, the clock change signal c.c also depends on the selection of the blocks 3 and 7. Specifically, when the first block 3 is selected, the clock change signal c.c assumes a low level which requires the periods of the clock signals $\phi 1$ and $\phi 2$ to be equal to the predetermined value T. When the second block 7 is selected, the clock change signal c.c assumes a high level which requires the periods of the clock signals $\phi 1$ and $\phi 2$ to be equal to the predetermined value 2T. When both the blocks 3 and 7 are selected, the clock change signal c.c assumes the high level which requires the periods of the clock signals $\phi 1$ and $\phi 2$ to be equal to the predetermined value 2T.

Figure 9:
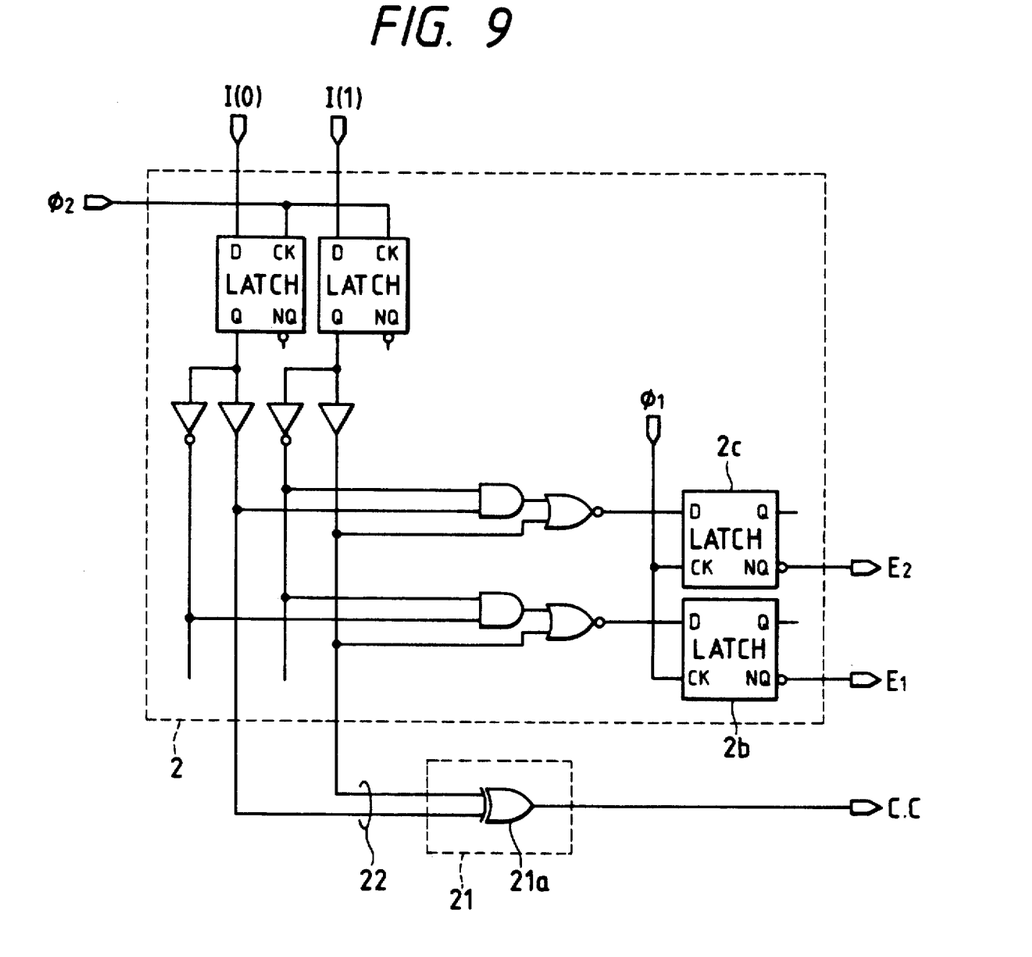
FIG. 9 is a block diagram of a part of the instruction decoder and the clock change signal generator in the data processing device of FIG. 5.

FIG. 9 shows the internal design of a part of the instruction decoder 2 and the clock change signal generator 21. The external instruction signal 13 has a predetermined number (32 for example) of bits $I(n) \ldots, I(1)$, $I(0)$ having coded information which represents an instruction or instructions. Specifically, the bits $I(1)$ and $I(0)$ has coded information which designates a block or blocks to be selected and enabled. The instruction decoder 2 includes D latches which sample the bits $I(n) \ldots, I(1), I(0)$ of the external instruction signal 13 in synchronism with the clock signal $\phi 2$. The sampled instruction information is transferred from the D latches to a decoding section including a combination of buffers, inverters, AND gates, and NOR gates. The instruction decoder 2 includes D latches 2b and 2c. An output signal from the decoding section which relates to the bits $I(1)$ and $I(0)$ of the external instruction signal 13 is sampled by the latches 2b and 2c in synchronism with the clock signal $\phi 1$. A signal generated at an NQ output terminal of the latch 2b composes the enable signal E1. A signal generated at an NQ output terminal of the latch 2c composes the enable signal E2.

The clock change signal generator 21 includes an OR gate 21a. The bits $I(1)$ and $I(0)$ of the external instruction signal 13 which are sampled by the latches within the instruction decoder 2 are transmitted via buffers to respective input terminals of the OR gate 21a. An output signal from the OR gate 21a composes the clock change signal c.c.

As shown in FIG. 5, the first block 3 includes a combination of an input latch 4, a data processing section 5, and an output latch 6. The internal data processing time of the data processing section 5 is equal to or smaller than the time T. The input latch 4 and the output latch 6 are connected to the instruction decoder 2 to receive the enable signal E1. The input latch 4 is connected to a data bus X. When the input latch 4 is enabled, the input latch 4 receives data from the data bus X. The output latch 6 is connected to a data bus Y. When the output latch 6 is enabled, the output latch 6 outputs data to the data bus Y.

The second block 7 includes a combination of an input latch 8, a data processing section 9, and an output latch 10. The internal data processing time of the data processing section 9 is equal to or smaller than the time 2T. The input latch 8 and the output latch 10 are connected to the instruction decoder 2 to receive the enable signal E2. The input latch 8 is connected to the data bus X. When the input latch 8 is enabled, the input latch 8 receives data from the data bus X. The output latch 10 is connected to a data bus Z. When the output latch 10 is enabled, the output latch 10 outputs data to the data bus Z.

For example, the first block 3 includes an adder while the second block 7 includes a multiplier. In general, the processing time of a multiplier is longer than the processing time of an adder.

The data processing device of FIG. 5 operates as follows. The clock generator 1 produces the clock signals $\phi 1$ and $\phi 2$ on the basis of the external clock signal $\phi$. The clock generator 1 changes the periods of the clock signals $\phi 1$ and $\phi 2$ in accordance with the clock change signal c.c fed from the clock change signal generator 21. When the clock change signal c.c is in the low level state, the periods of the clock signals $\phi 1$ and $\phi 2$ are equal to the predetermined value T. When the clock change signal c.c is in the high level state, the periods of the clock signals $\phi 1$ and $\phi 2$ are equal to the predetermined value 2T.

As described previously, the external instruction signal 13 contains coded information which designates a block or blocks to be enabled. When the clock signal $\phi 2$ is in the high level state, the instruction decoder 2 receives and decodes the external instruction signal 13.

Figure 6:
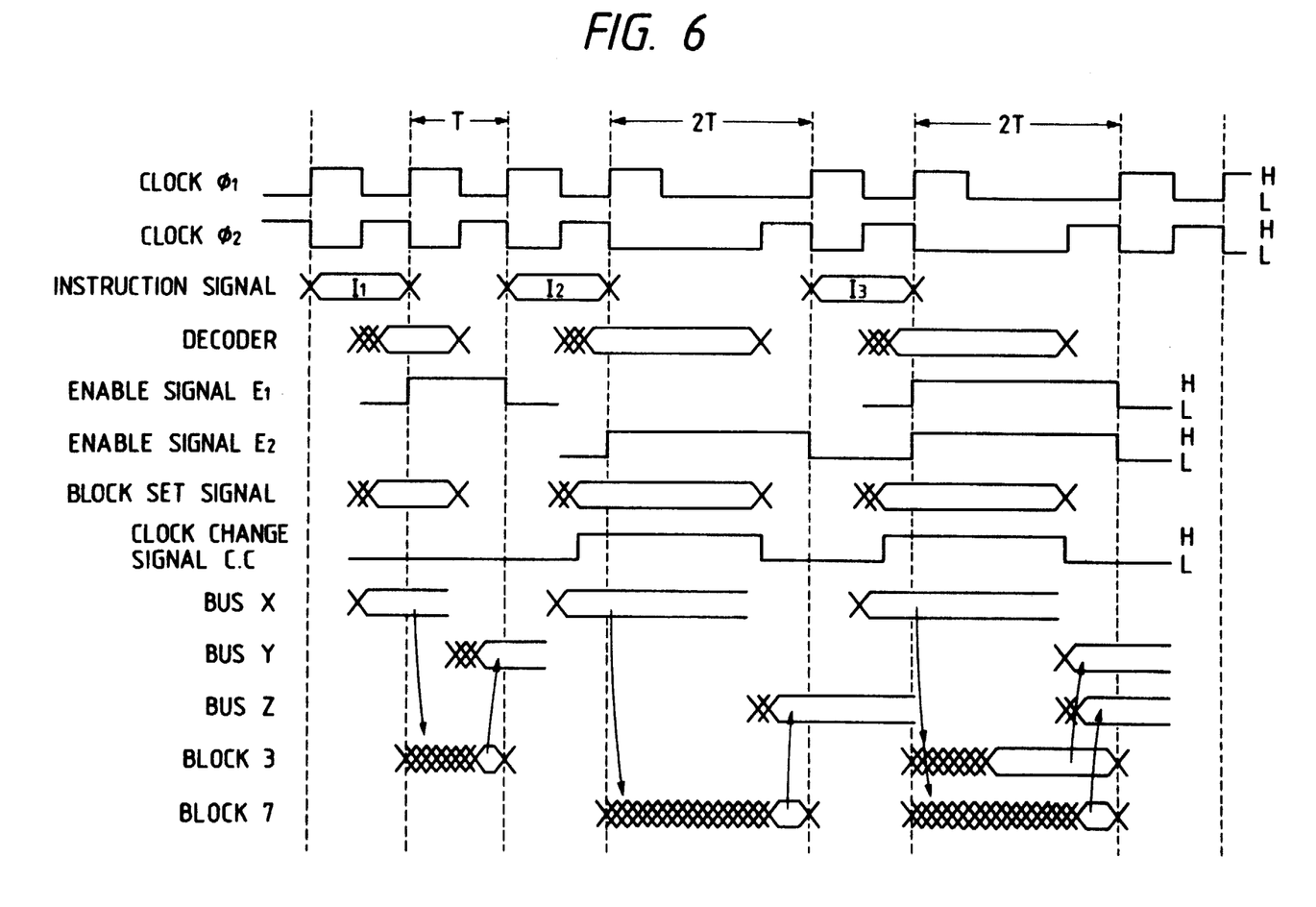
FIG. 6 is a timing diagram showing various signals in the data processing device of FIG. 5.

The operation of the data processing device of FIG. 5 will now be further explained with reference to FIG. 6. In the case where the external instruction signal 13 is of a first type I1 which requires the first block 3 to be selected, the instruction decoder 2 extracts the block selection information from the external instruction signal 13 and outputs the extracted information to the clock change signal generator 21 as the block set signal 22. The clock change signal generator 21 sets the clock change signal c.c to the low level state in response to the block set signal 22 so that the periods of the clock signals $\phi 1$ and $\phi 2$ are equal to the predetermined period T. In addition, the instruction decoder 2 outputs the high-level enable signal E1 to the first block 3 so that the first block 3 is enabled. The high-level enable signal E1 is started in synchronism with the clock signals $\phi 1$ and $\phi 2$. The duration of the high-level enable signal E1 equals the time T. The other enable signal E2 is held in the low level state so that the second block 7 remains inactive. In the first block 3, the input latch 4 receives data from the data bus X and the data processing section 5 processes the received data when both the enable signal E1 and the clock signal $\phi 1$ are in the high level states. The data processing section 5 completes the data processing within the time T. When both the enable signal E1 and the clock signal $\phi 2$ are in the high level states, the data corresponding to the result of the data processing are outputted to the data bus Y via the output latch 6.

In the case where the external instruction signal 13 is of a second type I2 which requires the second block 7 to be selected, the instruction decoder 2 extracts the block selection information from the external instruction signal 13 and outputs the extracted information to the clock change signal generator 21 as the block set signal 22. The clock change signal generator 21 sets the clock change signal c.c to the high level state in response to the block set signal 22 so that the periods of the clock signals $\phi 1$ and $\phi 2$ are equal to the predetermined period 2T. In addition, the instruction decoder 2 outputs the high-level enable signal E2 to the second block 7 so that the second block 7 is enabled. The high-level enable signal E2 is started in synchronism with the clock signals $\phi 1$ and $\phi 2$. The duration of the high-level enable signal E2 equals the time 2T. The other enable signal E1 is held in the low level state so that the first block 3 remains inactive. In the second block 7, the input latch 8 receives data from the data bus X and the data processing section 9 processes the received data when both the enable signal E2 and the clock signal $\phi 1$ are in the high level states. The data processing section 9 completes the data processing within the time 2T. When both the enable signal E2 and the clock signal $\phi 2$ are in the high level states, the data corresponding to the result of the data processing are outputted to the data bus Z via the output latch 10.

In the case where the external instruction signal 13 is of a third type I3 which requires both the blocks 3 and 7 to be selected, the instruction decoder 2 extracts the block selection information from the external instruction signal 13 and outputs the extracted information to the clock change signal generator 21 as the block set signal 22. The clock change signal generator 21 sets the clock change signal c.c to the high level state in response to the block set signal 22 so that the periods of the clock signals $\phi 1$ and $\phi 2$ are equal to the predetermined period 2T. In addition, the instruction decoder 2 outputs the high-level enable signal E1 to the first block 3 so that the first block 3 is enabled. The instruction decoder 2 also outputs the high-level enable signal E2 to the second block 7 so that the second block 7 is enabled. The high-level enable signals E1 and E2 are started in synchronism with the clock signals $\phi 1$ and $\phi 2$. The durations of the high-level enable signals E1 and E2 are equal to the time 2T. In the first block 3, the input latch 4 receives data from the data bus X and the data processing section 5 processes the received data when both the enable signal E1 and the clock signal $\phi 1$ are in the high level states. The data processing section 5 completes the data processing within the time T. When both the enable signal E1 and the clock signal $\phi 2$ are in the high level states, the data corresponding to the result of the data processing are outputted to the data bus Y via the output latch 6. In the second block 7, the input latch 8 receives data from the data bus X and the data processing section 9 processes the received data when both the enable signal E2 and the clock signal $\phi 1$ are in the high level states. The data processing section 9 completes the data processing within the time 2T. When both the enable signal E2 and the clock signal $\phi 2$ are in the high level states, the data corresponding to the result of the data processing are outputted to the data bus Z via the output latch 10.

As understood from the previous description, when the first block 3 spending a shorter processing time is selected, the periods of the clock signals $\phi 1$ and $\phi 2$ are shortened commensurately. Thus, the first block 3 is prevented from waiting or wasting an unnecessary time, and a high operation speed of the data processing device is enabled.

What is claimed is:

1. In a data processing circuit including first and second blocks which have different processing times and which operate in synchronism with a clock signal, wherein at least one of the first and second blocks is selected and enabled in accordance with an instruction changeable among first, second, and third states, the first state representing that the first block should be selected and enabled, the second state representing that the second block should be selected and enabled, the third state representing that both the first and second blocks should be selected and enabled, a method of controlling the clock signal, comprising the steps of:

detecting a current state of the instruction;
  setting a period of the clock signal to a first predetermined period when the current state of the instruction is detected to be the first state;
  setting the period of the clock signal to a second predetermined period when the current state of the instruction is detected to be the second state, the second predetermined period being longer than the first predetermined period; and
  setting the period of the clock signal to the second predetermined period when the current state of the instruction is detected to be the third state.

2. The method of claim 1, wherein the second predetermined period is equal to twice the first predetermined period.

3. In a data processing circuit including first and second blocks which have different processing times and which operate in synchronism with a clock signal, wherein at least one of the first and second blocks is selected and enabled in accordance with first coded information of an instruction, the first coded information being changeable among first, second, and third states, the first state representing that the first block should be selected and enabled, the second state representing that the second block should be selected and enabled, the third state representing that both the first and second blocks should be selected and enabled, and wherein second coded information of the instruction represents a desired period of the clock signal, the desired period having a predetermined relation with which of the first and second blocks should be selected, a method of controlling the clock signal, comprising the steps of:

detecting a current state of the first coded information;
  setting an actual period of the clock signal to a first predetermined period in response to the second coded information when the current state of the first coded information is detected to be the first state;

setting the actual period of the clock signal to a second predetermined period in response to the second coded information when the current state of the first coded information is detected to be the second state, the second predetermined period being longer than the first predetermined period; and setting the actual period of the clock signal to the second predetermined period in response to the second coded information when the current state of the first coded information is detected to be the third state.

4. The method of claim 3, wherein the second predetermined period is equal to twice the first predetermined period.

5. In a data processing circuit including first and second blocks which have different processing times and which operate in synchronism with a clock signal, wherein at least one of the first and second blocks is selected and enabled in accordance with an instruction changeable among first, second, and third states, the first state representing that the first block should be selected and enabled, the second state representing that the second block should be selected and enabled, the third state representing that both the first and second blocks should be selected and enabled, an apparatus for controlling the clock signal, comprising:

means for detecting a current state of the instruction;

means for setting a period of the clock signal to a first predetermined period when the current state of the instruction is detected by the detecting means to be the first state;

means for setting the period of the clock signal to a second predetermined period when the current state of the instruction is detected by the detecting means to be the second state, the second predetermined period being longer than the first predetermined period; and means for setting the period of the clock signal to the second predetermined period when the current state of the instruction is detected by the detecting means to be the third state.

6. The apparatus of claim 5, wherein the second predetermined period is equal to twice the first predetermined period.

7. In a data processing circuit including first and second blocks which have different processing times and which operate in synchronism with a clock signal, wherein at least one of the first and second blocks is selected and enabled in accordance with first coded information of an instruction, the first coded information being changeable among first, second, and third states, the first state representing that the first block should be selected and enabled, the second state representing that the second block should be selected and enabled, the third state representing that both the first and second blocks should be selected and enabled, and wherein second coded information of the instruction represents a desired period of the clock signal, the desired period having a predetermined relation with which of the first and second blocks should be selected, an apparatus for controlling the clock signal, comprising:

means for detecting a current state of the first coded information;

means for setting an actual period of the clock signal to a first predetermined period in response to the second coded information when the current state of the first coded information is detected by the detecting means to be the first state;

means for setting the actual period of the clock signal to a second predetermined period in response to the second coded information when the current state of the first coded information is detected by the detecting means to be the second state, the second predetermined period being longer than the first predetermined period; and means for setting the actual period of the clock signal to the second predetermined period in response to the second coded information when the current state of the first coded information is detected by the detecting means to be the third state.

8. The apparatus of claim 7, wherein the second predetermined period is equal to twice the first predetermined period.

9. A data processing device comprising:

means for generating a clock signal having a period changeable between first and second predetermined periods, the second predetermined period being longer than the first predetermined period;

first and second data processing blocks which have different processing times and which operate in synchronism with the clock signal;

means for selecting and enabling at least one of the first and second blocks;

means for setting the period of the clock signal to the first predetermined period when the selecting/enabling means selects and enables the first block;

means for setting the period of the clock signal to the second predetermined period when the selecting/enabling means selects and enables the second block; and means for setting the period of the clock signal to the second predetermined period when the selecting/enabling means selects and enables both the first and second blocks.

10. The apparatus of claim 9, wherein the second predetermined period is equal to twice the first predetermined period.

11. The apparatus of claim 9, wherein said means for selecting and enabling at least one of the first and second blocks comprises instruction decoding means responsive to an external instruction signal inputted to the data processing device.

12. The apparatus of claim 9, further comprising instruction decoding means responsive to an external instruction signal inputted to the data processing device, wherein said instruction decoding means comprises means for outputting a signal in accordance with coded information of the external instruction signal to effect setting of the clock period to the first and second predetermined periods.

13. The apparatus of claim 12, further comprising clock change signal generating means responsive to said signal outputted by said instruction decoding means for generating a clock change signal, said means for generating a clock signal being connected to receive said clock change signal.

* * * * *